3,132,547
LOADMETERS IN ROLLING MILLS
Charles C. Doyle, Stoney Creek, Ontario, and Kenneth R. Canfor, Dundas, Ontario, Canada, assignors to Dominion Foundries and Steel, Limited, Hamilton, Ontario, Canada
Filed Oct. 29, 1962, Ser. No. 233,768
4 Claims. (Cl. 80—56)

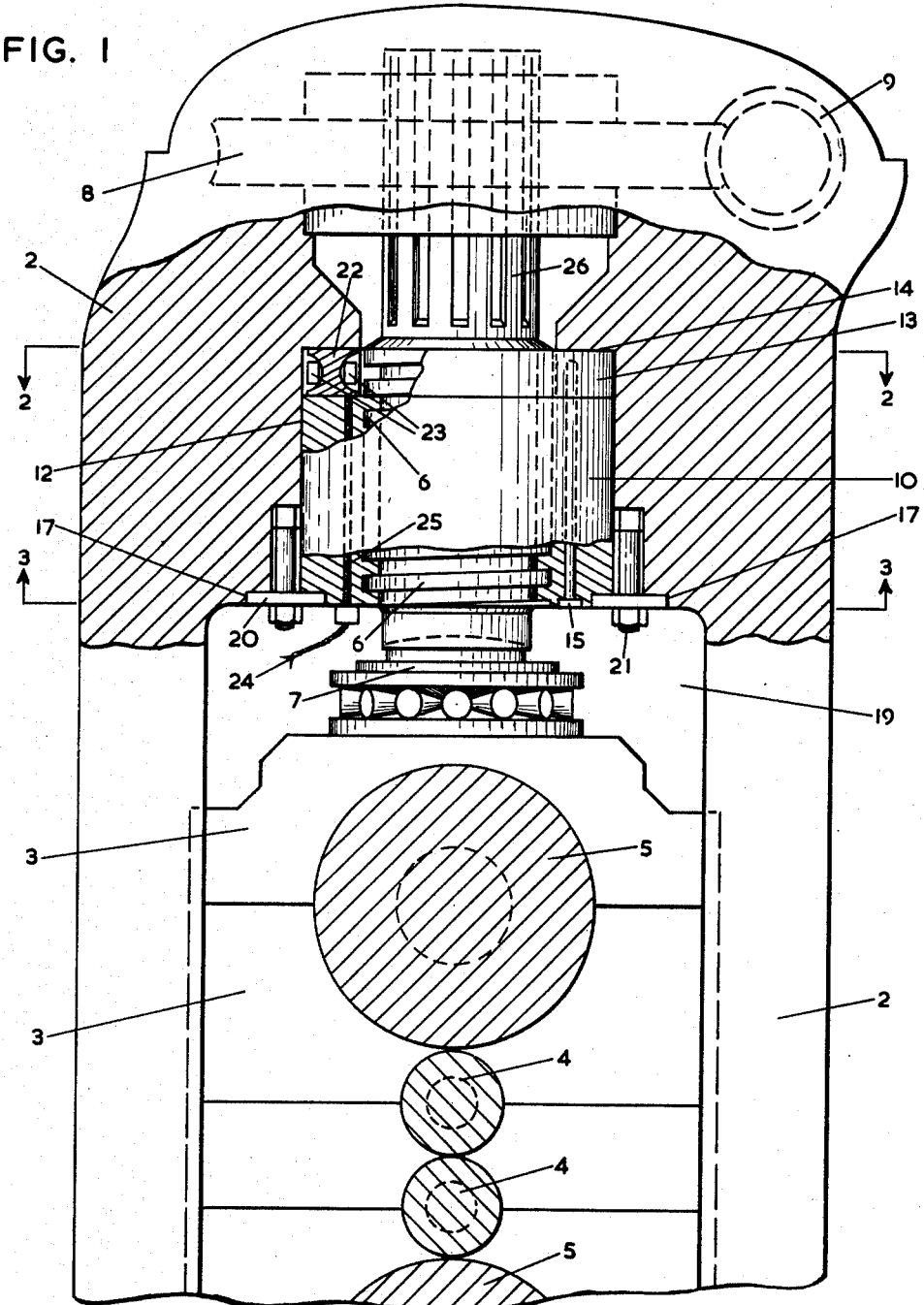

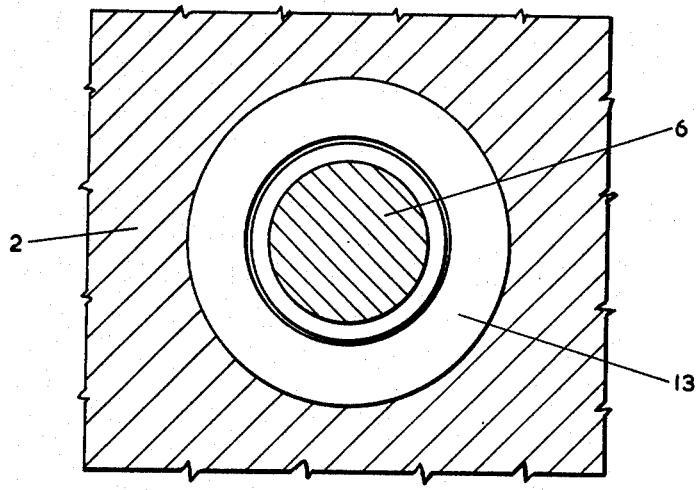
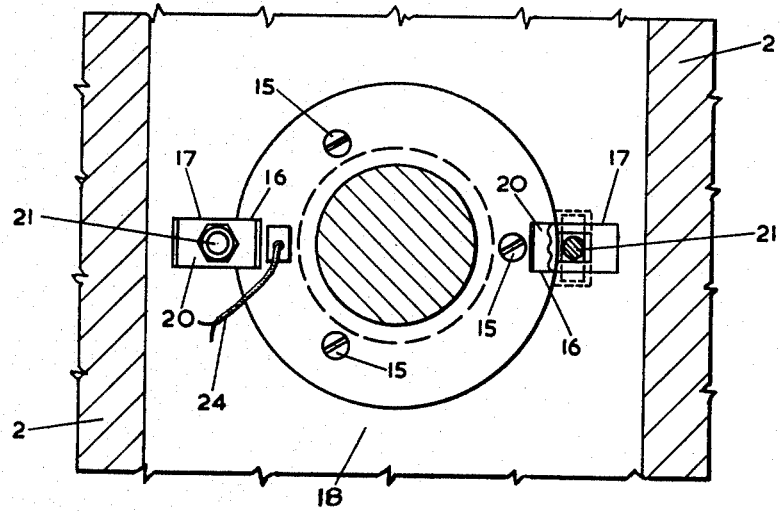

This invention relates to the art of rolling and in particular to use of loadmeters as incorporated in rolling mills to enable operators to gauge and maintain desired rolling pressures upon material in passage through a mill, and while the invention is applicable to the rolling art irrespective of any particular type of mill or material to be rolled, it is herein disclosed in conjunction with a 4-high strip mill.

In installation of load metering load cells in rolling mills it has been customary to position a load cell between the lower end of each load regulating adjusting screw and the top chock of each chock and roller assembly whereby the load cells measure load exerted upon the rollers by the adjusting screws. In such arrangements each load cell—unless sandwiched between two sets of thrust bearings interposed between the cell and the top chock and the cell and the lower end of the adjusting screw which is not a particularly practical arrangement— is in absence of a thrust bearing between the adjusting screw and the cell subjected to rotative frictions created by rotation of the adjusting screw. The frictions created are generally met by generous application of lubricant with undesirable possibility of lubricant dropping onto the rolled sheet, and furthermore as the lower end of a mill adjusting screw is generally located in proximity to strip coolant water spray it is difficult to satisfactorily seal the cell against moisture and temperature variations.

In accordance with the teachings of the present invention the foregoing difficulties are overcome to such an extent that the load cell is not subjected to rotative movement of the adjusting screw and is so positioned that there is no face to face movement between the cell and its contacting elements and whereby the necessity of cell lubrication is obviated.

The object of the present invention is to mount the conventional screw box, through which the conventional pressure adjusting screw of a mill is threaded, so that it has a sliding fit within the bore of an upwardly extending socket in the mill frame structure, the upper end face of the screw box bearing against a load cell contained within the upper end of the socket and whereby application of rolling load under downward pressure of the adjusting screw creates an upwardly directed opposing force upon the screw box and in turn upon the load cell.

With the foregoing and other objects in view, as shall be apparent as the specification proceeds, the invention consists of a mill roll pressure adjusting screw mounting assembly and associated load cell constructed and arranged all as hereinafter more particularly described and illustrated in the accompanying drawings in which:

FIG. 1 is a broken away fragmentary elevation of the device of the invention as used in connection with a 4-high mill.

FIG. 2 is a horizontal cross-sectional view taken through the line 2—2, FIG. 1, and FIG. 3 is a horizontal cross-sectional view taken through the line 3—3, FIG. 1.

Referring to the drawings, FIG. 1 illustrates the general assembly of a 4-high strip mill wherein the roll housing frame 2 contains a plurality of vertically slidable roll chocks 3 carrying the work rolls 4 and back up rolls 5. Required rolling load between the work rolls is attained by actuation of a downwardly extending adjusting screw having its lower threaded end 6 thrusting against a suitable annular thrust bearing assembly 7 mounted upon the top of the upper chock 3. For rotation of the adjusting screw, the upper unthreaded portion 26 of the screw is slidably splined within a worm wheel 8 rotatable for roll pressure adjustment by a power driven worm 9.

The lower threaded end 6 of the adjusting screw is threaded through an internally threaded cylindrical screw box 10 which has a close sliding fit within the bore of an inverted socket 12 in the frame. An annular load cell 13 is interposed between the upper face of the screw box and the lower face of the socket shoulder 14, the outside diameter of the cell being substantially the same as the outside diameter of the screw box and its inside diameter sufficient to clear the adjusting screw threads. To facilitate ready removal of the load cell for inspection or replacement and to prevent possible rotation of the cell, the cell is attached to the upper face of the screw box 10 by a plurality of fine screws 15 extending through the box and attached to the cell and whereby the cell is removable in conjunction with the screw box.

For retention of the screw box 10 against rotation upon the adjusting screw being turned, the lower face of the screw box is formed with a pair of slots 16 positioned to register with a pair of slots 17 formed in the top face 18 of the chock block containing gap 19 in the frame 2. A pair of retainer plates 20 are contained within the registering slots and held in place by T-bolts 21 contained within and depending from the frame 2 adjacently to the peripheral face of the screw box.

The annular load cell 13 follows a known practice in design wherein a suitably shaped cell core 22 is equipped with strain gauges 23. The gauges are connected by leads 24 to load indicating instruments, as in standard practice, the leads extending from the load cell through a passage 25 in the screw box.

In operation, application of load to the bite of the rolls 4 under downward movement of the adjusting screw creates an opposing upwardly directed force upon the adjusting screw, which force is transmitted to the screw box 10 through which the screw is threaded, thus tending to raise the screw box within the socket 12 whereby the screw box exerts a load upon the load cell 13 proportionate to the load applied by the adjusting screw and whereby the cell functions in measuring the load.

From the foregoing description it will be apparent that the invention makes it possible to so locate a load cell in a strip mill that the cell is not subjected to rotative friction of screwdown adjustments and is sealed from exposure to moisture and against undesirable temperature variations.

Although a preferred embodiment of the invention has been illustrated and described herein, it will be understood that many changes in the construction and steps disclosed may be made without departing from the spirit of the invention or the scope of the appended claims.

We claim:

1. In a rolling mill, a frame supporting a pair of working rolls positioned one above the other, a vertical screw directed downwardly towards the axes of the rolls and exerting a load force upon the rolls upon the downward rotation of the screw, an internally threaded screw box through which the screw is threaded, said box being mounted above the rolls and movable upwardly of the frame in reaction to the load force exerted by the screw upon the rolls, and a load-meter load cell retained in position in the frame above the screw box and against which the screw box presses.

2. A rolling mill as defined in claim 1, wherein the screw extends downwardly through an inverted socket in the frame, the upper inner end of the socket terminating in an annular shoulder extending inwardly to the periphery of an orifice of less diameter than the diameter of the socket and through which orifice the screw extends into the socket, the load cell being annular to freely surround the screw and positioned in the socket between the top of the screw box and the shoulder in the upper end of the socket.

3. A rolling mill as defined in claim 1, wherein the screw extends downwardly through an inverted socket in the frame, the upper inner end of the socket terminating in an annular shoulder extending inwardly to the periphery of an orifice of less diameter than the diameter of the socket and through which orifice the screw extends into the socket, the load cell being annular to freely surround the screw and positioned in the socket between the top of the screw box and the shoulder in the upper end of the socket, means securing the load cell to the top of the screw box, and a detachable retainer plate secured to the frame and extending into the lower portion of the screw box to retain the box against rotation while permitting the box vertical movement within the socket.

4. A rolling mill as defined in claim 1, wherein the screw extends downwardly through an inverted socket in the frame, the upper inner end of the socket terminating in an annular shoulder extending inwardly to the periphery of an orifice of less diameter than the diameter of the socket and through which orifice the screw extends into the socket, the load cell being annular to freely surround the screw and positioned in the socket between the top of the screw box and the shoulder in the upper end of the socket, a lead extending from the load cell to an indicating instrument, and a passage within the screw box extending from the upper face to the lower face of the box and through which the lead extends.

References Cited in the file of this patent

UNITED STATES PATENTS

| | | |
|---|---|---|
| 661,017 | Kuhlewind | Oct. 30, 1900 |
| 2,173,493 | Peters | Sept. 19, 1939 |
| 2,276,843 | Hathaway | Mar. 17, 1942 |
| 3,003,374 | Smith | Oct. 10, 1961 |